(No Model.)
S. T. LAMB.
WAGON BRAKE.
No. 455,106. Patented June 30, 1891.
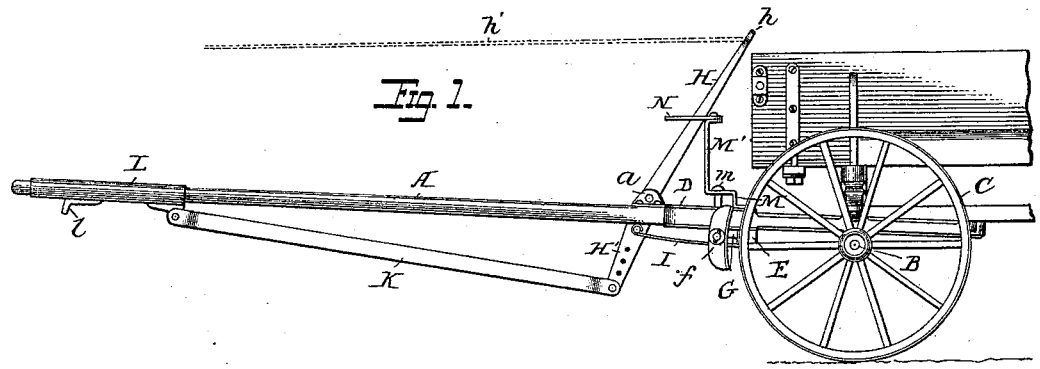
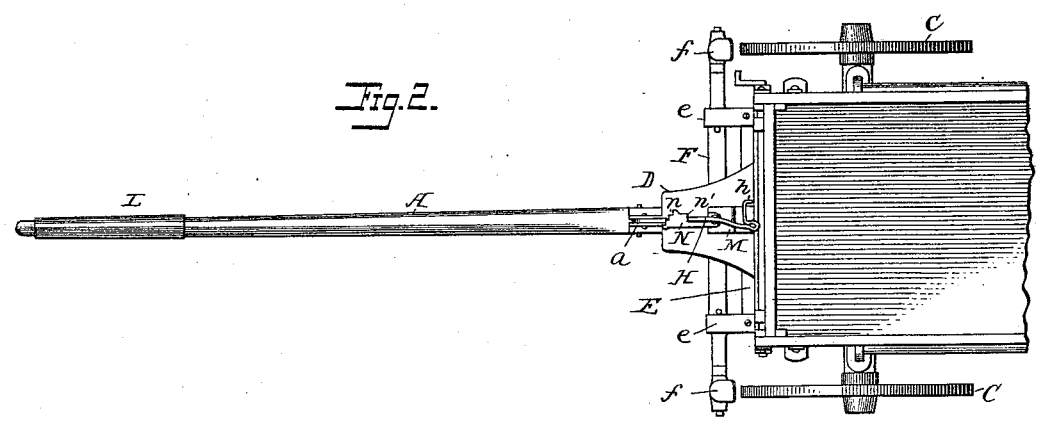
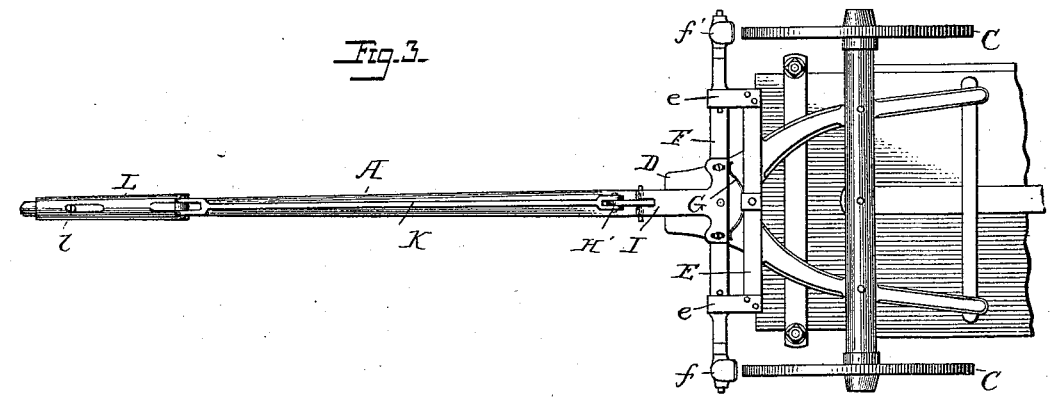
WITNESSES
Jno. G. Hinkel
H. S. McArthur
INVENTOR
Salem T. Lamb.
By Foster & Freeman
Attorneys

UNITED STATES PATENT OFFICE.

SALEM T. LAMB, OF NEW ALBANY, INDIANA.

WAGON-BRAKE.

SPECIFICATION forming part of Letters Patent No. 455,106, dated June 30, 1891.

Application filed September 15, 1890. Serial No. 364,973. (No model.)

*To all whom it may concern:*

Be it known that I, SALEM T. LAMB, a citizen of the United States, residing at New Albany, Floyd county, State of Indiana, have invented certain new and useful Improvements in Wagon-Brakes, of which the following is a specification.

My invention relates to wagon-brakes, and has for its object to provide a brake which may be applied to the forward portion of the periphery of the forward wheels of the wagon, cart, vehicle, artillery-carriage, &c., and which may be applied automatically by the animal drawing the wagon, or by hand or foot power by the driver mounted on the vehicle, or by the rider of the animal driving the vehicle.

To these ends my invention consists in a brake device constructed, arranged, and operating substantially as more particularly hereinafter pointed out, whereby these objects are accomplished in a simple, cheap, and effective manner.

Referring to the accompanying drawings, I have illustrated the preferred embodiment of my invention, and Figure 1 is a side view showing a portion of a wagon with my improvement applied thereto. Fig. 2 is a top plan view, and Fig. 3 is a bottom plan view.

In the drawings I have shown my invention applied to a four-wheeled wagon, a portion only of which wagon is shown; but it will be understood that it may be applied to any vehicle in substantially the same manner.

In all cases I preferably apply the brakes to the peripheries of the forward wheels and to the forward part of such peripheries, and I will now describe the manner illustrated in the drawings of applying the brake device.

The tongue or pole A is connected to the axle B of the wheels C in any desired manner, and secured to the under side of the hounds D is a cross-bar E, and mounted on the ends of this bar are the guides *e*, in which moves the brake-bar F, having at its outer ends the brake-shoes F'. These shoes are connected to the ends of the brake-bar by being pivoted thereto at or near their centers *f*, so that the bearing-surface of the shoe will adjust itself to bear evenly and forcibly against the forward portion of the periphery of the wheels. The brake-bar is normally held forward, so that the brake-shoes are out of contact with the wheels, by some spring device, and I have shown a bent spring G as secured to the bar E and having its ends bearing against the brake-bar F with sufficient force to release the brakes from the wheels and to hold them normally out of contact therewith.

Mounted in the tongue or pole A, and preferably supported by the brackets *a* upon the upper portion of the pole and extending through a slot in the pole, is a brake-lever H, and connecting this lever with the brake-bar is a rod I, which is arranged underneath the pole. The lower end of the brake-lever is provided with an extension H', having a series of holes, to which may be adjustably attached one end of the connecting-rod K, the other end of which is pivotally connected to a sleeve L, sliding on the forward end of the pole A. This sleeve is provided with a projection *l*, preferably on the under side, which is adapted to be engaged by the ring or other attachment of the neck-yoke of the harness, and by this means the brake is automatically applied when the horses or other animals hold back, as in going downhill, the sleeve L sliding on the pole, and through the medium of the connecting-rod K operating the brake-lever H, and this in turn through the rod I forcing the brake-shoes at the ends of the brake-bar against the front periphery of the wheel. By suitably adjusting the end of the connecting-rod in the various holes in the extension of the brake-lever the desired force and bearing of the brake-shoes against the wheels can be regulated, and in some instances I find it is sufficient to secure the end of the connecting-rod in the uppermost hole of the extension, so that the rod is practically parallel with the tongue or pole and the bearing of the brake-shoes is practically in a line with the sleeve on the pole.

The upper portion of the brake-lever H is preferably formed with a lateral extension *h*, by which the lever can be operated by hand or foot of the driver from the vehicle, and I further attach to this end of the brake-lever a cord or equivalent device *h'*, which may extend forward and have its free end attached to the hames or other part of the harness and furnish a means for operating the brake by the rider of the wheel-horse.

Mounted upon the upper portion of the hounds is a support or bracket M, having a pin $m$, to which the doubletree is attached, and this support is extended upward to form a bearing M' for a trigger N, which is pivoted thereto and adapted to swing laterally in the plane of the pole. This trigger is provided on its forward portion with a series of notches $n$, adapted to engage the brake-lever H and hold it locked in position, with the brake-shoes bearing against the wheels, in order that the brake may be locked, so that the brake-shoes will not come in contact with the wheels. When, for instance, it is desired to back the vehicle, I provide on the rear portion of the lateral extension of the trigger a notch $n'$, which is adapted to engage the forward edge of the brake-lever to rigidly maintain the brake-shoes out of position in contact with the wheels. This trigger M may be swung to one side, so as not to interfere with the operations of the brake-lever; but when it is desired to back the vehicle, as just described, it may be swung into position to engage the front edge of the brake-lever, or when it is desired to permanently apply the brake-shoes, as when the vehicle is at rest and it is desired to apply the brakes and prevent the animals running away, the trigger is swung into position, so as to engage the rear side of the brake-lever and lock the brake-shoes tightly against the periphery of the wheels.

It will thus be seen that I provide a brake device for wagons in which the brake-shoes are applied to the forward portion of the forward wheels, and which may be operated either automatically by the horses holding back, by the rider on the wheel-horse through the medium of the cord $h'$, or by the hand or foot of the driver upon the vehicle, and in all cases the action is direct and positive. It will further be seen that by arranging the brake-bar and attachments on the under side of the pole they do not in any way interfere with the attachment and operation of the doubletree, and the whole apparatus, operating as a combined break, consists of exceedingly few parts, which may be cheaply and strongly made, and which are not liable to get out of order.

In order that the parts may be adjusted for wear or other purposes, I attach the connecting-rod I to the brake-bar by means of elongated holes, through which screws or bolts pass, that hold it to the brake-bar, and I preferably make the rod I flattened and extended to form a T-shaped piece, as clearly shown in Fig. 3, where the cross-piece of the T is adjustably secured to the brake-bar, and the end of the rod or plate is slitted to embrace the end of the brake-lever and is secured to projections thereon.

It is evident that parts of my invention can be used separately from the other parts or in combination with other equivalent devices without departing from the essential features of the invention.

What I claim is—

1. In a brake apparatus, the combination of a brake-bar carrying brake-shoes arranged to bear against the forward portion of the forward wheels, a sleeve on the pole connected to operate the brake-bar, and a brake-lever pivotally connected with the pole, the said brake-lever being provided with a cord extending forward, whereby the brake may be applied automatically by the team, by hand or foot of the driver, and by the rider of the wheel-horse, substantially as described.

2. In a brake device, the combination, with the brake-bar carrying shoes bearing on the periphery of the forward wheels, a hand-operated brake-lever connected therewith to operate the bar, a sleeve on the tongue, and a connecting-bar between the sleeve and adjustably connected to an extension of the brake-lever, of a locking device engaging the hand-operated brake-lever, whereby the brake may be operated automatically or by hand or locked out of operative position, substantially as described.

3. In a brake device, the combination, with a brake-bar carrying brake-shoes bearing against the periphery of the forward wheels, of a brake-lever pivotally connected to the tongue and connected to operate the brake-bar, and a pivoted locking device having notches to engage the rear of the brake-lever, substantially as described.

4. In a brake device, the combination, with a brake-bar, the pivoted shoes thereon, the pivoted brake-lever for operating the bar, a sliding sleeve, and connections between the sleeve and brake-lever, of a locking device having two sets of notches arranged to engage both the forward and the rearward side of the brake-lever, substantially as described.

5. In a brake device, the combination, with a brake-bar carrying brake-shoes bearing against the periphery of the forward wheels, the said brake-bar being supported beneath the hounds, of a brake-lever for operating the brake-bar pivotally mounted in the tongue adjacent to the hounds, a bracket for the doubletree arranged above the hounds, and an extension on the bracket carrying a locking device for the brake-operating lever, substantially as described.

6. In a brake device, the combination, with the hounds, of a brake-bar sliding in guides beneath the bar and carrying brake-shoes bearing on the periphery of the forward wheels, a brake-lever pivotally mounted above the hounds and connected to the brake-bar, a doubletree-bracket arranged above the hounds, an extension to said bracket, and a pivoted trigger mounted on said extension, substantially as described.

7. In a brake device, the combination, with the hounds, of a bar secured thereto having guides at its ends, a brake-bar adapted to bear against the forward periphery of the forward wheels and sliding in said guides, a spring normally forcing the brake-bar forward, a brake-lever mounted in the tongue adjacent to the hounds and connected to the brake-bar, a sleeve mounted on the pole, and connections between the sleeve and brake-lever, substantially as described.

In testimony whereof I have signed my name to this specification in the presence of two subscribing witnesses.

SALEM T. LAMB.

Witnesses:
WILLIAM W. TULEY,
FRED. SAUER.